United States Patent
Bhat et al.

(10) Patent No.: US 10,958,697 B2
(45) Date of Patent: *Mar. 23, 2021

(54) APPROACH TO LIVE MULTI-CAMERA STREAMING OF EVENTS WITH HAND-HELD CAMERAS

(71) Applicant: ARRIS Enterprises LLC, Suwanee, GA (US)

(72) Inventors: Dinkar N. Bhat, Princeton, NJ (US); Richard Dziekan, North Wales, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,903

(22) Filed: Oct. 7, 2020

(65) Prior Publication Data

US 2021/0021753 A1     Jan. 21, 2021

Related U.S. Application Data

(63) Continuation of application No. 15/802,019, filed on Nov. 2, 2017, now Pat. No. 10,812,700.

(51) Int. Cl.
*H04L 29/06* (2006.01)
*H04N 5/232* (2006.01)
(Continued)

(52) U.S. Cl.
CPC ........ *H04L 65/4069* (2013.01); *G06F 3/0482* (2013.01); *G06F 3/04842* (2013.01);
(Continued)

(58) Field of Classification Search
CPC ... H04L 65/4069; H04L 65/601; H04L 67/18; H04L 67/306; G06F 3/04842; G06F 3/0482; G06F 16/58
See application file for complete search history.

(56) References Cited

U.S. PATENT DOCUMENTS 6,833,865 B1 * 12/2004 Fuller ................ H04N 1/00326
348/231.2
7,907,638 B2 * 3/2011 Norhammar ....... H04N 21/4402
370/493

(Continued)

OTHER PUBLICATIONS

Documents cited on this form were previously made of record in prior application U.S. Appl. No. 15/802,019, filed Nov. 2, 2017, upon which the Applicant relies for the benefits provided in 35 U.S.C. § 120.

*Primary Examiner* — Kyung H Shin
(74) *Attorney, Agent, or Firm* — Buchanan, Ingersoll & Rooney PC

(57) ABSTRACT

A system provides access to previously unassociated cameras that are concurrently at different specific locations at a single event, sending the real-time video and audio stream of said cameras to a central processing entity, transcoding and serving the real-time content to consumers in a way that associates the content as different camera angles of the same event, along with additional data from each camera owner such as twitter feeds. Also disclosed is a system for providing a user, via a client device, the ability to choose a desired feed for viewing the event and the ability to change the selected feed based a number of user-selected criteria.

17 Claims, 10 Drawing Sheets

(51) Int. Cl.
  *H04N 1/00*      (2006.01)
  *H04N 19/597*    (2014.01)
  *H04L 29/08*     (2006.01)
  *G06F 3/0482*    (2013.01)
  *G06F 3/0484*    (2013.01)
  *G06F 16/58*     (2019.01)

(52) U.S. Cl.
  CPC ...... *H04L 65/1063* (2013.01); *H04L 65/1069* (2013.01); *H04L 65/1089* (2013.01); *H04L 65/4076* (2013.01); *H04L 65/605* (2013.01); *H04L 65/607* (2013.01); *H04L 67/306* (2013.01); *H04N 1/00326* (2013.01); *H04N 5/23203* (2013.01); *H04N 19/597* (2014.11); *G06F 16/58* (2019.01)

(56) References Cited

U.S. PATENT DOCUMENTS

2010/0171834 A1* 7/2010 Blumenfeld ........ G06F 3/04842
                                              348/159
2015/0346832 A1* 12/2015 Cole .................. H04L 65/4069
                                              345/156
2016/0381111 A1* 12/2016 Barnett ................ H04L 67/306
                                              709/231

* cited by examiner

APPROACH TO LIVE MULTI-CAMERA STREAMING OF EVENTS WITH HAND-HELD CAMERAS

FIELD

This disclosure relates generally to the field of streaming-based solutions to broadcasting of live events using multiple cameras.

BACKGROUND

Live-streaming of events to other devices has become popular in recent years. For example, apps exist soliciting a stream of a sporting event or concert, to share live to a large number of viewers. However, one limitation is the use of a single camera and hence a single point of view. Many entertainment events and certainly all major sporting events require the use of multiple camera angles so that the viewer can be fully engaged in the show.

FIG. 1 is a diagram of an example video distribution system 100 operating in accordance with current examples known in the art. Referring to FIG. 1, a multi-view service system 100 generally includes a mobile device 114, e.g. an iPhone, user 112, live stream app 116, live stream server 118 including data content network, or DCN and Cloud 120, and clients including, for example, a PC Laptop and browser 126, social media 122 and a mobile device 124, such as an iPhone.

In an example embodiment, the video distribution system comprises a video source system 102 connected through a communication network 101 to at least one user equipment 130. The communication network 101 comprises a streaming server 120 configured to stream multi-view video data to at least one user equipment 130. The user equipments have access to the communication network 101 via wire or wireless links. In an example embodiment, one or more user equipments are further coupled to video rendering devices such as a HD IV set, a display screen and/or the like. The video source system 102 transmits video content to one or more clients, residing in one or more user equipment, through the communication network 101. A user equipment 130 may play back the received content on its display or on a rendering device with wire, or wireless, coupling to the receiving user equipment 130. Examples of user equipments comprise a laptop, a desktop, a mobile phone, IV set, and/or the like.

A streaming server 120 transmits compressed video streams to one or more clients residing in one or more user equipments 130. In the example of FIG. 2, the streaming server 120 is located in the communication network 101. The streaming of compressed video content, to user equipments, is performed according to unicast, multicast, broadcast and/or other streaming method.

However, one over-riding limitation in these systems is that the use of a single camera provides a single point of view. As previously mentioned, many entertainment events and certainly all major sporting events require the use of multiple camera angles so that the viewer can be fully engaged in the show. The embodiments described herein describe a way to use multiple cameras and customized apps (for example, on mobile devices such as smart phones, such as the iPhone®) in a coordinated fashion with a server so that an engaging show with several camera angles can be achieved with the ability for the viewer using an appropriate client app to effectively switch between views intelligently.

The embodiments and solutions described herein disclose a solution where multiple cameras are coordinated through a transcoder server that manages the cameras in the system, and generates a consolidated output to viewers. The server ensures that every camera registers with it, and generates output that allows clients to properly switch between different views.

Embodiments are discussed using iOS (Apple) developed technology, namely, HLS for streaming, but the approach can be extended to other streaming approaches like DASH.

SUMMARY

In accordance with one aspect of the invention, a method of providing a multi-camera system for live streaming of video data is disclosed. The method can comprise registering a first camera device with a server, the first camera device having audio, video and/or metadata data, encoding the first camera device data into a first compressed stream, registering a second camera device with the server, the second camera device having audio, video and/or metadata data, encoding the second camera device data into a second compressed stream; and transcoding the first and second compressed streams according to bandwidth constraints.

In an embodiment, the registering a first camera device with a server comprises steps of transmitting a join request from the first camera device to the server; evaluating the join request from the first camera device at the server; and accepting the join request from the first camera device at the server.

Such a method can also comprise one or more of the steps of assigning an identification to the first camera device at the server, transmitting an accept message to the first camera device from the server, and transmitting a URL for an HLS manifest file to the server from the first camera device.

In another example, for the first camera device, any metadata is synced with audio and/or video data in the first compressed stream and for the second camera device, any metadata is synced with audio and/or video data in the second compressed stream.

The metadata can comprise one or more of the following: text data entered by a camera device user, URLs to relevant information, GPS coordinates of a camera device, images or pictures of items relevant to video data, angle and orientation of camera device, and distance to items being filmed.

The method described herein can further comprise packetizing the transcoded the first and second compressed streams, providing the packetized first and second compressed streams to an HLS chunker. The HLS chunker can output a set of transport stream chunks for each of the first and second compressed streams. The transport stream chunks for the first compressed stream and the transport stream chunks for the second transport stream can line up with each other at a chunk boundary. The server can monitor the quality of the first camera device data and second camera device data. The server can remove a camera device if the quality of the camera device data falls below a threshold.

Yet another embodiment includes a method of accessing a multi-camera system for live streaming of video data by a client device. The method comprises joining a server that is collecting and processing video data from multiple camera devices, receiving a set of available video streams provided by the multiple camera devices, and presenting the set of available video streams to a user. Joining the server can comprise authenticating the client and authorizing the client to access the multi-camera system. The set of available video streams can include metadata comprising one or more of the following: title, thumbnail, date, time, number of streams, quality, popularity and description.

The embodiment described above can also comprise selecting a stream set by the user, transmitting the selected stream set from the client device to the server, or establishing a streaming session at the client device and accessing the streaming session by the user.

In an embodiment, presenting the set of available video streams to a user comprises selecting a first stream to present according to one of, oldest stream first, newest stream first, best quality stream first, most popular stream first, and based on metadata.

Another embodiment includes a client device for providing multi-camera live streaming of video data, comprising a processor configured to load and execute instructions from a server that is collecting and processing video data from multiple camera devices. The server can be configured to register multiple camera devices, each camera device having audio, video and/or metadata data, encode each camera device data into a compressed stream, and transcode each compressed stream according to bandwidth constraints.

In an embodiment, the client device can be configured to present each of the compressed streams to a user.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

An example embodiment of the present invention and its potential advantages are best understood by referring to FIGS. 1-10 of the drawings, like numerals being used for like and corresponding parts of the various drawings. The FIGS. 1-10, discussed below, and the various embodiments used to describe the principles of the present disclosure are by way of illustration only and should not be construed in any way to limiting the scope of the disclosure. Those skilled in the art will understand the principles of the present disclosure may be implements in any suitably arranged mobile communication device, server and clients.

In an embodiment, previously unassociated cameras that are concurrently at different specific locations at a single event, send real-time video and audio stream originating from those cameras to a central processing entity, in a sense "crowd-sourcing." At the central processing entity, the real-time content is transcoded and served to consumers in a way that associates the content as different camera angles of the same event. Additional data from each camera owner is include, e.g. such as twitter feeds.

In one embodiment, N cameras can stream audio/video (in compressed fashion) to a stream server which can then combine the video feeds together. Any camera can register or join with the server, or leave at anytime. In every instance that a camera joins the server, the camera is assigned a unique ID. The stream server runs a transcoder that can accept an AN (audio/video) stream with timed metadata from a camera and then create a consolidated AN output containing streams from all the cameras. The timed ID3 metadata from each camera can provide context-sensitive information as observed by the camera. In one embodiment, it is text typed by the camera operator or social media information (e.g., a twitter feed).

Hence, the solutions disclosed herein solve the problem of systems being limited to single camera feeds. The embodiments described herein also describe away to use multiple cameras and customized apps in a coordinated fashion with a server so that an engaging show with several camera angles can be achieved with the ability for the viewer using an appropriate client app to effectively switch between views intelligently. The embodiments and solutions described herein also disclose a solution where multiple cameras are coordinated through a transcoder server that manages the cameras in the system, and generates a consolidated output to viewers. The server ensures that every camera registers with it, and generates output that allows clients to properly switch between different views. The solutions described enable rich metadata to be transmitted from the cameras to the clients via the server.

Figure 3:
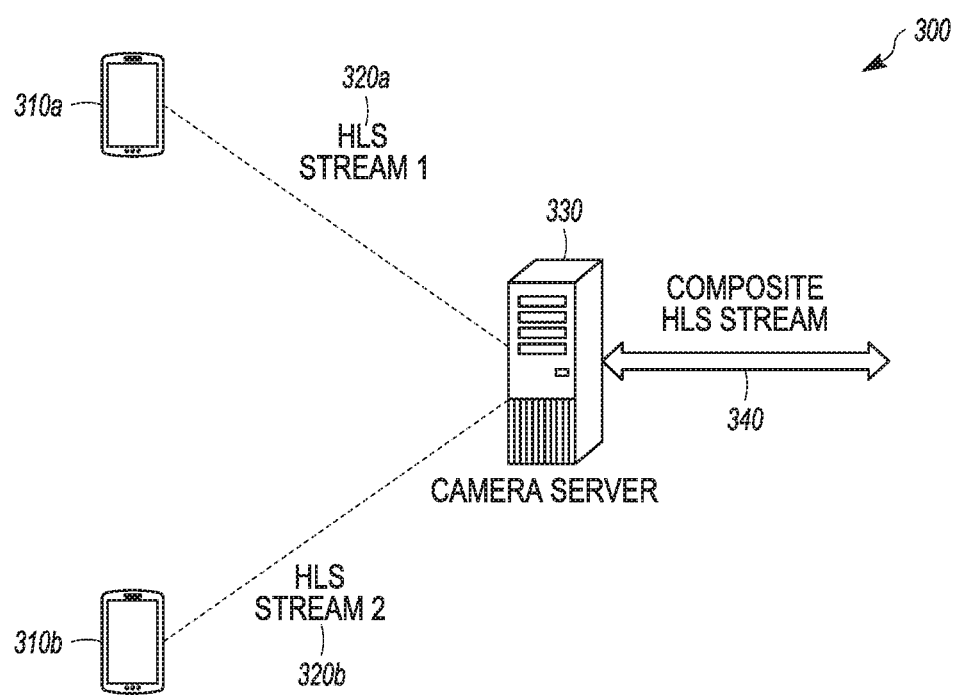
FIG. 3 is a multi-camera system with a camera server which feeds clients.

FIG. 3 illustrates an example of a multi-camera system with a camera server which sends output to clients. System 300 generally includes device 310a, HLS stream 1 230a, camera server 330, composite HLS stream 340, device 310b and HLS Stream 2 320b.

Beginning with the initial registration of the camera device with the server, a camera registers with the "camera server" 330 (called "server" henceforth) in order to broadcast its video by sending a "join" request over a well-known IP address over multicast. The server can listen on said well-known multicast address. In one embodiment, the join request also includes the GPS coordinates of the camera and its IP address. The join request can include other parameters as well. Upon receiving a request, the server 330 evaluates said request. If the server cannot accept the request, it sends back a reject message on the same multicast address. If the server 330 accepts the join request from the camera, then the camera is assigned an ID and added to a database in the server. The server then sends the accept message to camera. The camera sends a URL for the HLS manifest to the server which will be used to pull or request content.

Figure 1:
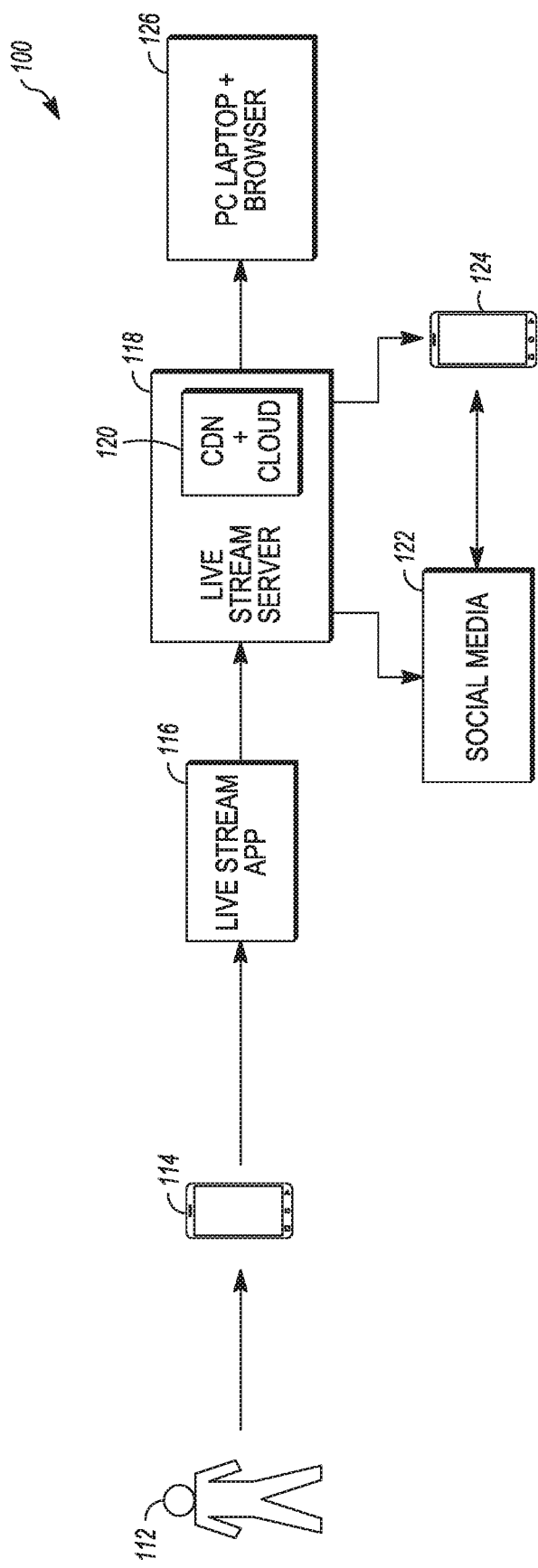
FIG. 1 is a diagram of an example of a current video distribution system known in the art.
Figure 2:
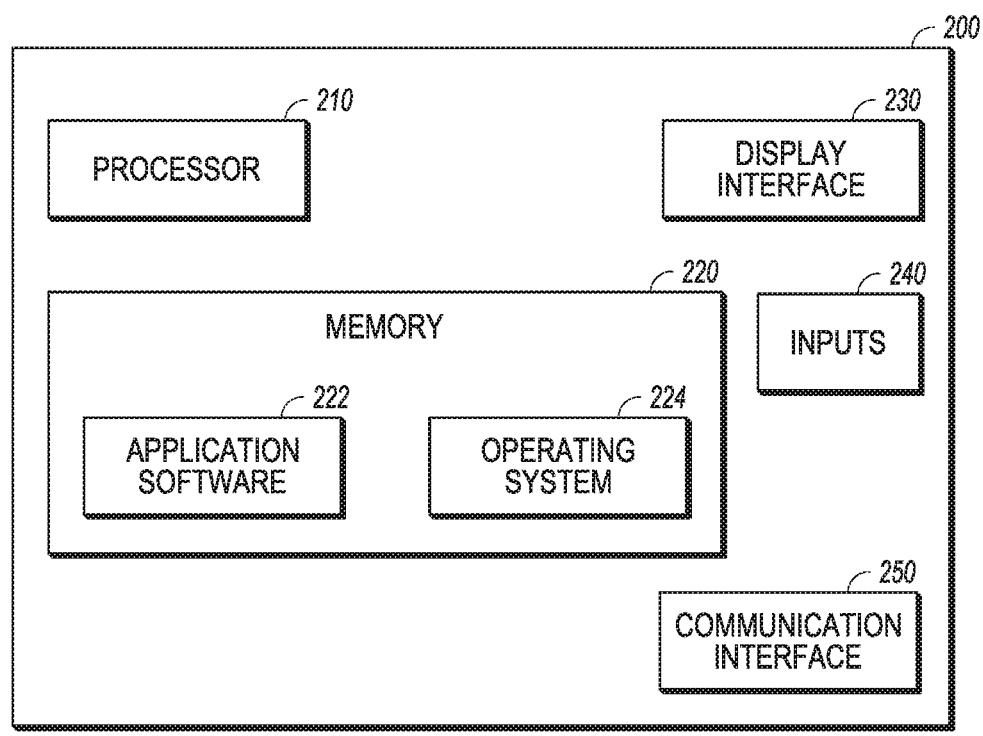
FIG. 2 illustrates various components of an illustrative computing-based device 200.

FIG. 2 illustrates various components of an illustrative computing-based device 200 which may be implemented as any form of a computing and/or electronic device, and in which embodiments of a server and/or a client as described above may be implemented.

The computing-based device 200 comprises one or more inputs 240 which are of any suitable type for receiving media content, Internet Protocol (IP) input, activity tags, activity state information, resources or other input. The device also comprises communication interface 250 to enable the device to communicate with one or more other entity using any suitable communications medium.

Computing-based device 200 also comprises one or more processors 210 which may be microprocessors, controllers or any other suitable type of processors for processing computing executable instructions to control the operation of the device in order to provide a search augmentation system. Platform software comprising an operating system 224 or any other suitable platform software may be provided at the computing-based device to enable application software 222 to be executed on the device.

The computer executable instructions may be provided using any computer-readable media, such as memory 220. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 230 is provided to control a display device to be used in conjunction with the computing device. The display system may provide a graphical user interface, or other user interface of any suitable type.

Figure 4:
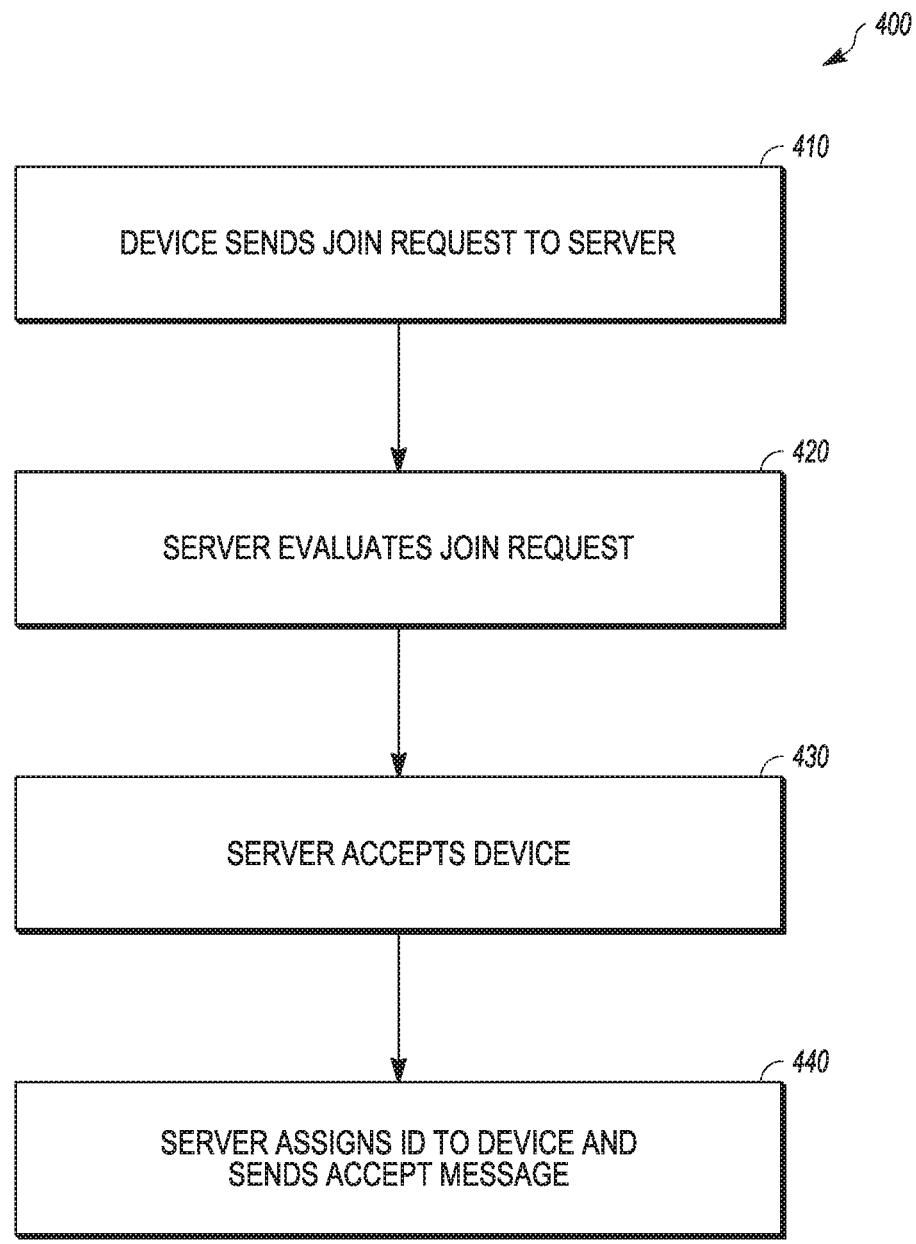
FIG. 4 shows an example process 400 for registering a camera with the server.

The flowchart in FIG. 4 provides a more general understanding of the registration of a camera with the server 330. At step 410, the initial registration of the camera device with the server, a camera may register with the "camera server" 330 (called "server" henceforth) when it wants to broadcast its video by sending a "join" request over a well-known IP address over multicast. In one embodiment, the server may listen on a well-known multicast address. The join request may also include other information, for example, the GPS coordinates of the camera and the IP address of the camera. The join request may also contain other information about the camera, location or event. In an embodiment, the request can also include information about its streaming capability—specifically, bandwidth, resolution and frame-rate.

At step 420, upon receiving a request, the server 330 evaluates it. If the server cannot accept the request, the server sends back a reject message on the same multicast address. The request can be rejected for example, because there are too many cameras already in the system (exceeding a numerical threshold or a bandwidth limit), or if the new camera is too close (defined by a proximity threshold) to an existing camera. At step 430, if the server accepts the camera, then the camera is assigned an ID at step 440 and added to a database in the server. Each camera is assigned a unique ID. Also in step 440, the server then sends the accept message to requestor, e.g. the camera. The camera sends the URL for the HLS manifest to the server which will be used to request or pull content. In one embodiment, all cameras use the same codec (H.264/AVC).

If a camera wishes to leave the camera database explicitly by sending a leave message on the well-known multicast address, the camera is removed from the camera database. In an embodiment, the camera is also removed from the camera database if the server detects a camera has stopped sending video, or is disconnected by the server for other reasons explained in this disclosure. A camera can join into the system at any time according to the method described in FIG. 4.

Moving on to video transmission, once a camera completes the handshake with the server 330, the camera can stream video to the server 330. In the case of an iPhone, streaming would take place via an HLS stream. In an HLS stream, the audio, video and timed metadata would be part of a transport stream(s), and a transcoder on the server pulls the stream using HTTP. In the case of other devices, it can be another type or approach of streaming, e.g. DASH.

Figure 6:
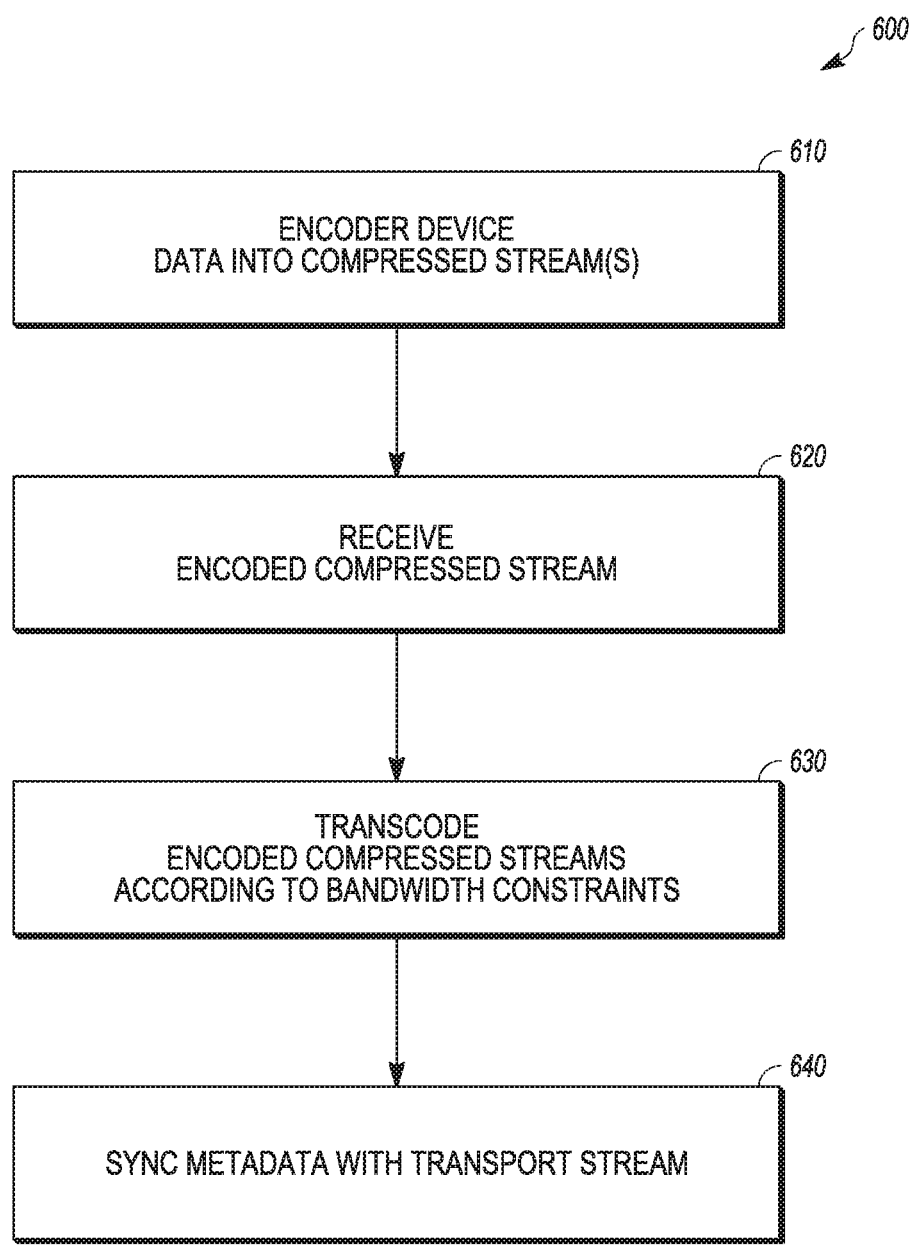
FIG. 6 shows example steps in a video transmission.
Figure 7:
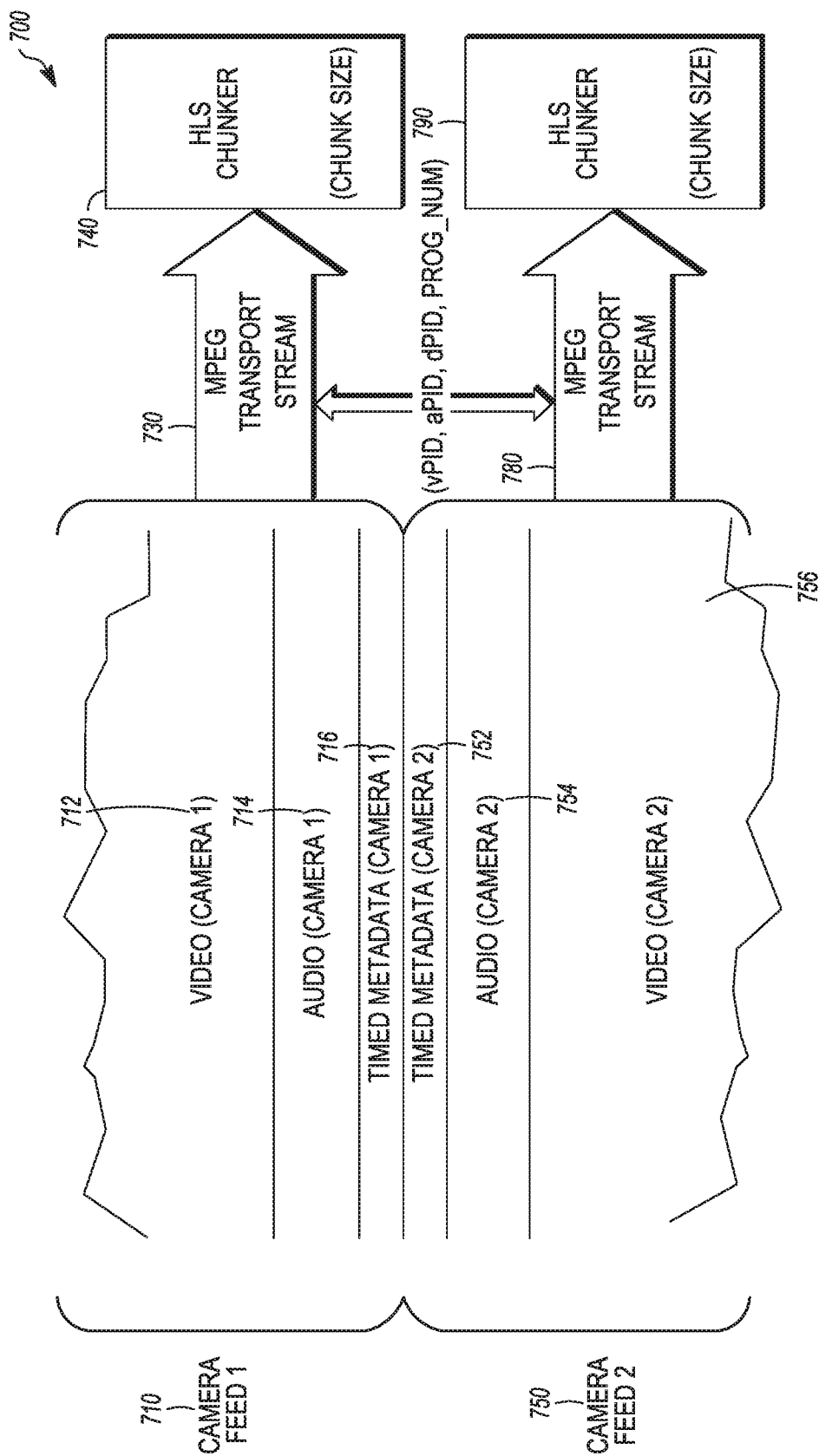
FIG. 7 is an example of transcoding and processing multiple camera feeds to obtain consolidated HLS output.

As understood in context with each other, FIG. 7 is an example diagram illustrating transcoding and processing multiple camera feeds in order to obtain consolidated output, for example, HLS output and FIG. 6 further illustrates example steps in a video transmission shown in FIG. 7. In system 700 as shown, N camera feeds, shown here as Camera Feed 1 710 and Camera Feed 2 750, produce Camera 1 Audio Data 714, Video Data 712, and Timed Metadata 716, Camera 2 Audio Data 754, Video Data 756, and Timed Metadata 752. The resulting MPEG Transport Streams 730 and 780 Output HLS Chunker 740 from Stream 730 and HLS Chunker 790 from Stream 780.

Beginning at step 610 and once a camera has been accepted into the system, the server starts encoding the raw camera capture using the AVC codec for video and AAC codec for audio. The resulting compressed audio/video streams are encapsulated into MPEG-2 TS (transport streams) and chunked. It can include timed metadata (see below). At step 620, the server pulls the HLS encoded media from each camera that is registered into the system using the published manifest file obtained during registration. It then, at step 630, transcodes the audio, video and metadata according to bandwidth available (described later). The reason to transcode the input feed, as opposed to passing them through, is to ensure that the feeds are properly switchable, and managed in terms of bandwidth and quality. Further, clients that connects to thecamera server can request for multi-bitrate streams of the consolidated feed which would not be possible if pass through was used.

Figure 5:
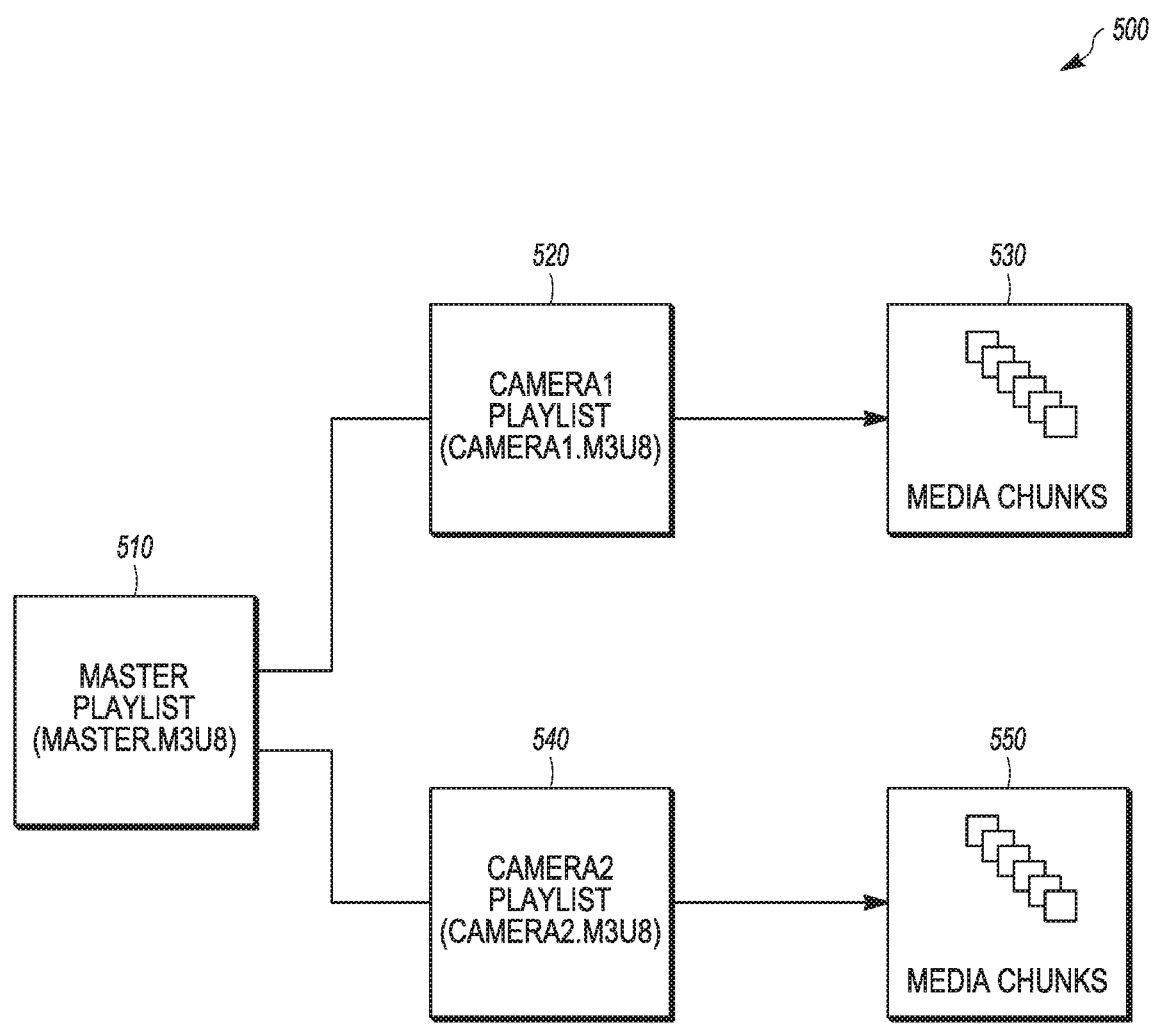
FIG. 5 is an example composite HLS stream with two cameras.

Timed metadata from each camera is sent to the server using the ID3 metadata protocol. The ID3 protocol requires that the metadata be encapsulated using PES packets. At step 640, the PTS values in the PES packets ensures that the metadata is in sync with the video and audio. When the server transcodes the audio/video from the camera, it preserves the PES packet payload of the metadata stream but ensures that the PTS values are regenerated in sync with the new Transport Stream. Some examples of the types of metadata included would be: text data entered by a camera operator, URLs to interesting information that can be parsed by the client, GPS coordinates of the camera, Images like pictures of players or field, text data entered by a camera operator, Angle & orientation of the camera, and distance to objects being filmed Each live camera feed can be handled the same way independently by the camera server and hence the output of the server on processing each feed can be a set of transcoded audio/video and metadata streams. When the transcoded audio and video with metadata is packetized and fed to a HLS chunker, the output can be a set of Transport Stream chunks containing the camera feed audio, video and 103 metadata elementary streams with same predefined packet identifiers (PIOs) and program number (as shown by vPIO, aPIO, dPIO, prog_num in FIG. 3). The PIOs are described in the Program Map Table (PMT) of the MPEG-2 Transport Stream. These are present in every chunk of every feed along with a Program Association Table (PAT) which lists the program number and PIO of the PMT. Such data is common across all feeds. The metadata PIO can be signaled by metadata_descriptor that allows a client to identify it. The consolidated set of feeds is described by the manifest file (master.m3u8), as shown in FIG. 5. FIG. 5 is an example composite HLS stream with two cameras. Composite HLS stream 500 include master playlist 510, camera1 playlist 520, media chunks 530, camera 2 playlist 540, and media chunks 550. The chunks 530 and 550 associated with each camera feed 520, 540 are described by a cameraX.m3u8 as in FIG. 5, where X denotes the camera number: for example here, {1,2}. In an embodiment, since camera feeds can be dynamically added or removed, the master.m3u8 510 also updates dynamically. A client can use master.m3u8 to keep track of the camera feeds being sent.

The chunk size can be fixed beforehand (for example, typically 5-1Os), where each chunk starts with an IDR picture. In other words, each chunk corresponds to an integral number of GOP (Group Of Picture), which can be kept identical across camera feeds, and this allows for seamless switching from one camera feed to another. The boundary of a chunk can represent an opportunity for a client to switch from one camera feed to another, and encoding the boundary using an IDR picture allows for switching cleanly.

Each camera sends a transport stream to the server which then transcodes the content to fixed chunk size, bandwidth corresponding to the camera capability. The transcoder ensures that the video across different cameras are encoded such that a client can switch seamlessly between the videos streams; i.e the IDR frames across the different videos are aligned. It also ensures that the timed metadata sent by each camera is re-inserted into the video. The server creates a consolidated manifest file and outputs the transcoded AN streams accordingly. Following is an example of the consolidated manifest file (.m3u8 since we are using HLS) with two cameras feeding the server.

The manifest.m3u8 as described is the only possible representation. A client on receiving the consolidated manifest can present appropriate interface to the user so that (s)he can switch between the camera feeds and present the timed metadata appropriately.

The following is an example of the consolidated manifest file (.m3u8 since we are using HLS) with two cameras feeding the server. The example comprises possible descriptions of camera1.m3u8, camera2.m3u8 and master.m3u8 where a single bitrate=A1 is used for each feed:

master.m3u8
EXTM3U
EXT-X-VERSION:3
EXT-X-STREAM-INF: BANDWIDTH=A1,CODECS="avc1.4d401f, mp4a.40.2", RESOLUTION=1280×720 http://x1.com/camera1.m3u8
EXT-X-STREAM-INF:BANDWIDTH=A1,CODECS="avc1.4d401fmp4a.40.2",RESOLUTION=1280×720 http://x1.com/camera2.m3u8
 camera1.m3u8
 #EXTM3U
 #EXT-X-KEY:METHOD=NONE
 #EXT-X-TARGETDURATION:12
 #EXT-X-MEDIA-SEQUENCE:494
 #EXTINF:10,505.ts
 505.ts
 #EXTINF:10,506.ts
 506.ts
 #EXTINF:10,507.ts
 507.ts
 camera2.m3u8
 #EXTM3U
 #EXT-X-KEY:METHOD=NONE
 #EXT-X-TARGETDURATION:12
 #EXT-X-MEDIA-SEQUENCE:494
 #EXTINF:10,505.ts
 705.ts
 #EXTINF:10,506.ts
 706.ts
 #EXTINF:10,507.ts
 707.ts In an embodiment, the server monitors the quality of the input camera feed and if the quality falls below a threshold, the camera feed can be removed from the system, as described in the previous section. The following parameters are monitored minimally:

The Transport Error Indicator (TEI) in the input TS Packet header. The server can reject the camera stream if the TEI is set.

The continuity count in the input Transport Stream adaptation. If the count remains discontinuous over a period of time, the server can reject the feed.

The PTS values of the input camera stream. If the successive PTS values do not reflect the frame rate for a certain number of successive frames, the camera feed is dropped. The reason is that the input feed is too choppy.

The audio/video quality of the feed. While transcoding the input video, if a quality metric of the video (like PSNR) or audio noise metric falls below a threshold, or if the stream has encoding artifacts, then the feed can be dropped.

If a camera feed is dropped, then it can be ensured that the master.m3u8 file is appropriately updated. Once a feed is dropped, any client can switch to a different feed seamlessly.

In an embodiment, each transcoded feed is allocated bandwidth (say A1) till a maximum (say M) is reached. When M is reached, then no more feeds are allowed into the system. A multi-bitrate variant (with multiple resolutions) of the consolidated feed can also be generated in which case a client can dynamically select the optimal bandwidth consolidated feed. For example, a three-level multi-bitrate consolidated feed set can be generated with each feed allocated three bandwidths (A1, A1/2, A1/3) of appropriate resolutions.

Referring now to a client component for a multiple camera viewing system. The client device can be used to select between different multi-camera views. In an embodiment, a client desires to view a live event in real-time and wants to be able to choose the video stream, or camera view, that he wants to see. In the embodiments described above, the server has subscribed to one or more camera sources which are submitting video to a camera server. The user, or client, wants the ability to choose the stream(s) that is desired for viewing.

In an embodiment, the consolidated manifest file can change dynamically based on cameras entering to the system. The system can be extended to include multibitrate situation; for instance, the output of the server can be a set of bitrates of different resolution for each camera. As has been described, the multiuse-camera system is used to enable a client to select between different views and provide variety of details through the use of metadata.

When a client loads master.m3u8 by requesting it from the camera server, it can parse through the manifest to determine the types of feeds available. A client can automatically select one of the feeds by default.

Figure 8:
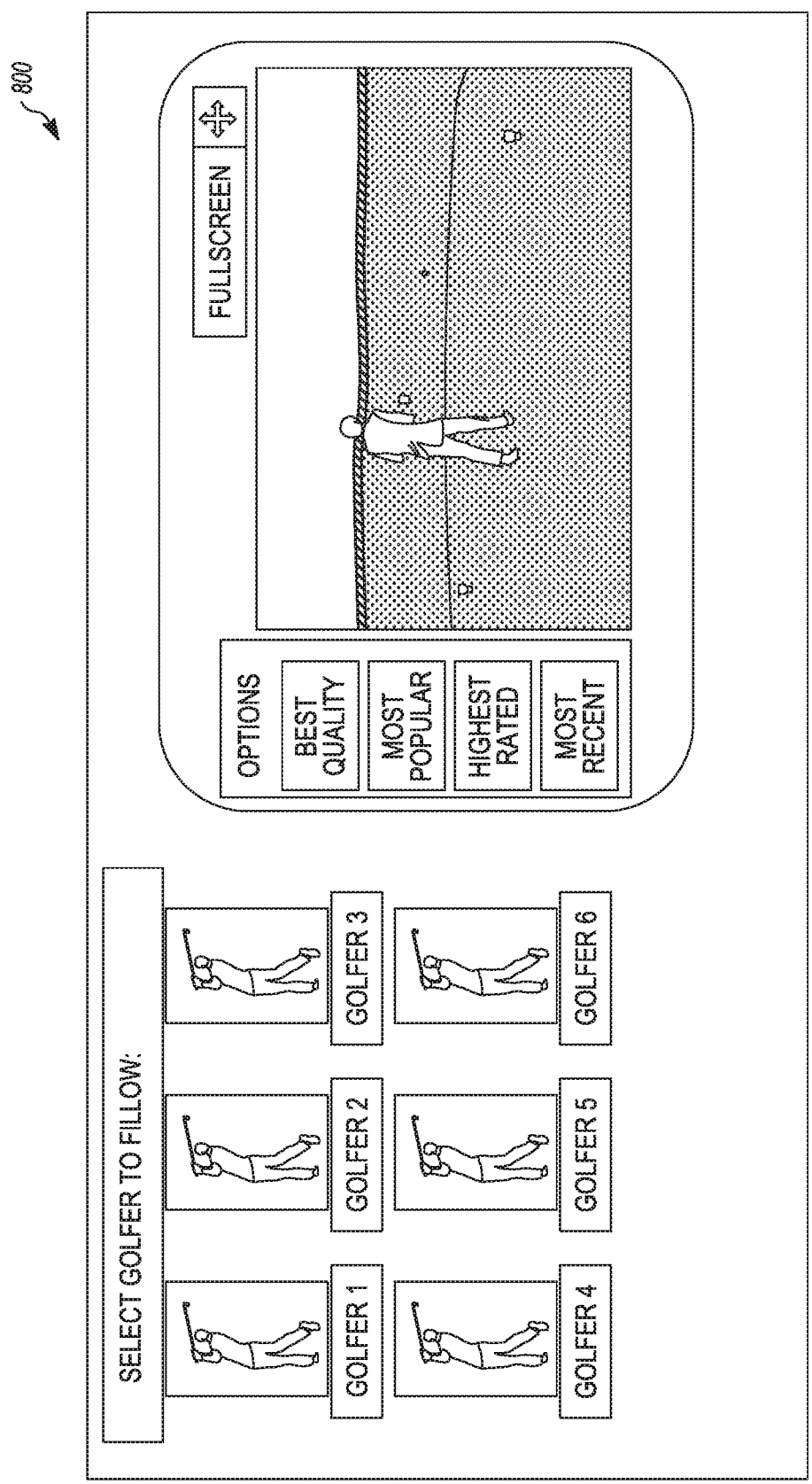
FIG. 8 is an example user interface (UI) shown on a client device.

FIG. 8 is an example user interface as displayed to a user on a client device. Once a client has successfully connected, the client is presented with a set of available multi-video streams via the User Preference Interface GUI, as explained below in FIGS. 9 and 10. For example, in FIG. 8, the streams are presented as Golfer 1, Golfer 2, Golfer 3, Golfer 4, Golfer 5, and Golfer 6. Each of these streams will have certain meta-data attributes, as can be present in streams. In FIG. 8, for example, these attributes comprise Best Quality, Most Popular, Highest Rated, and Most Recent.

The client will present options, for example, like these displayed in FIG. 8, to a user via the user interface 800. When the user selects a stream set, the client will relay that to the servers, and a streaming session will be established. These steps are further described below in relation to FIGS. 9 and 10.

Figure 9:
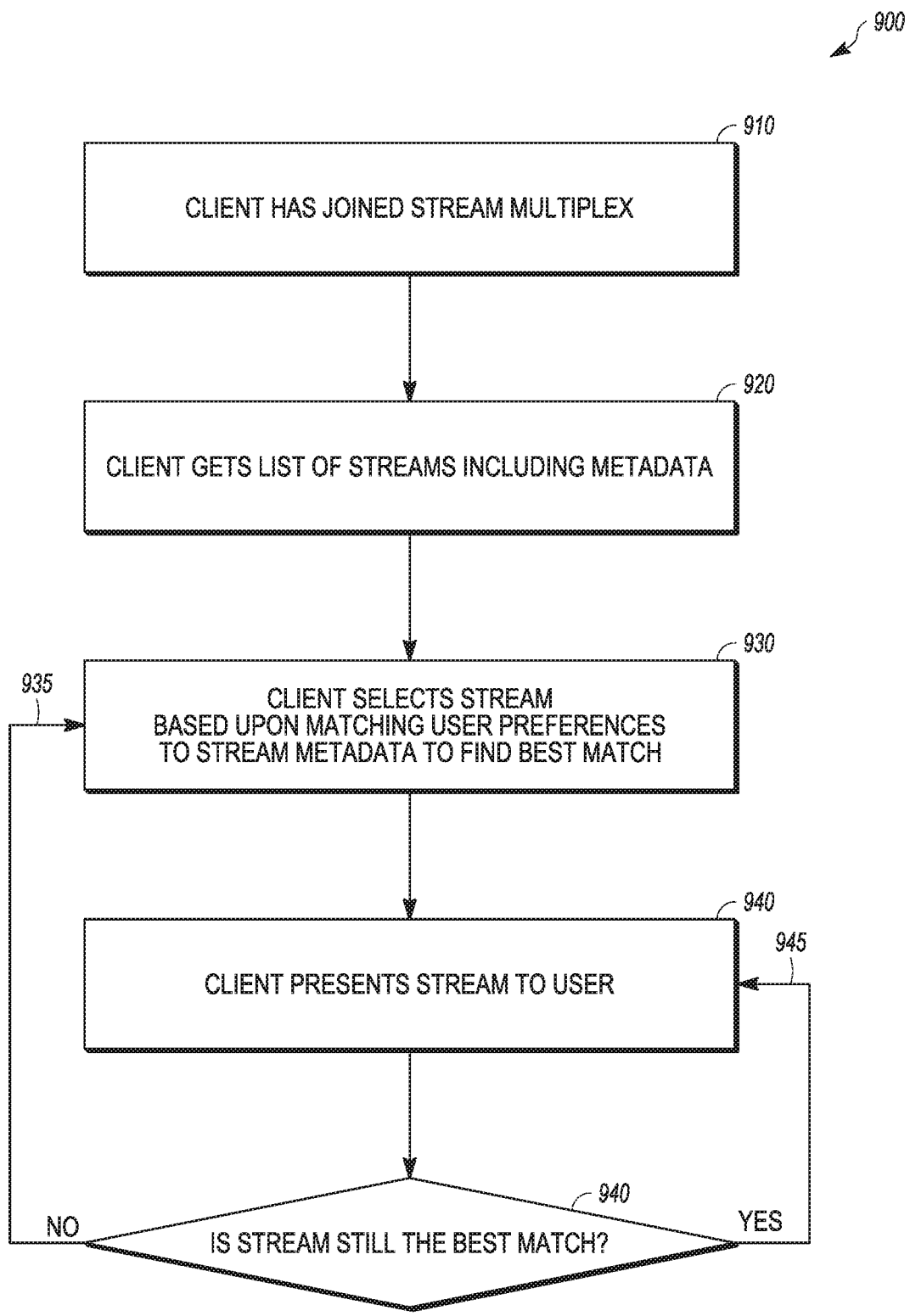
FIG. 9 is a flowchart illustrating stream selection process.
Figure 10:
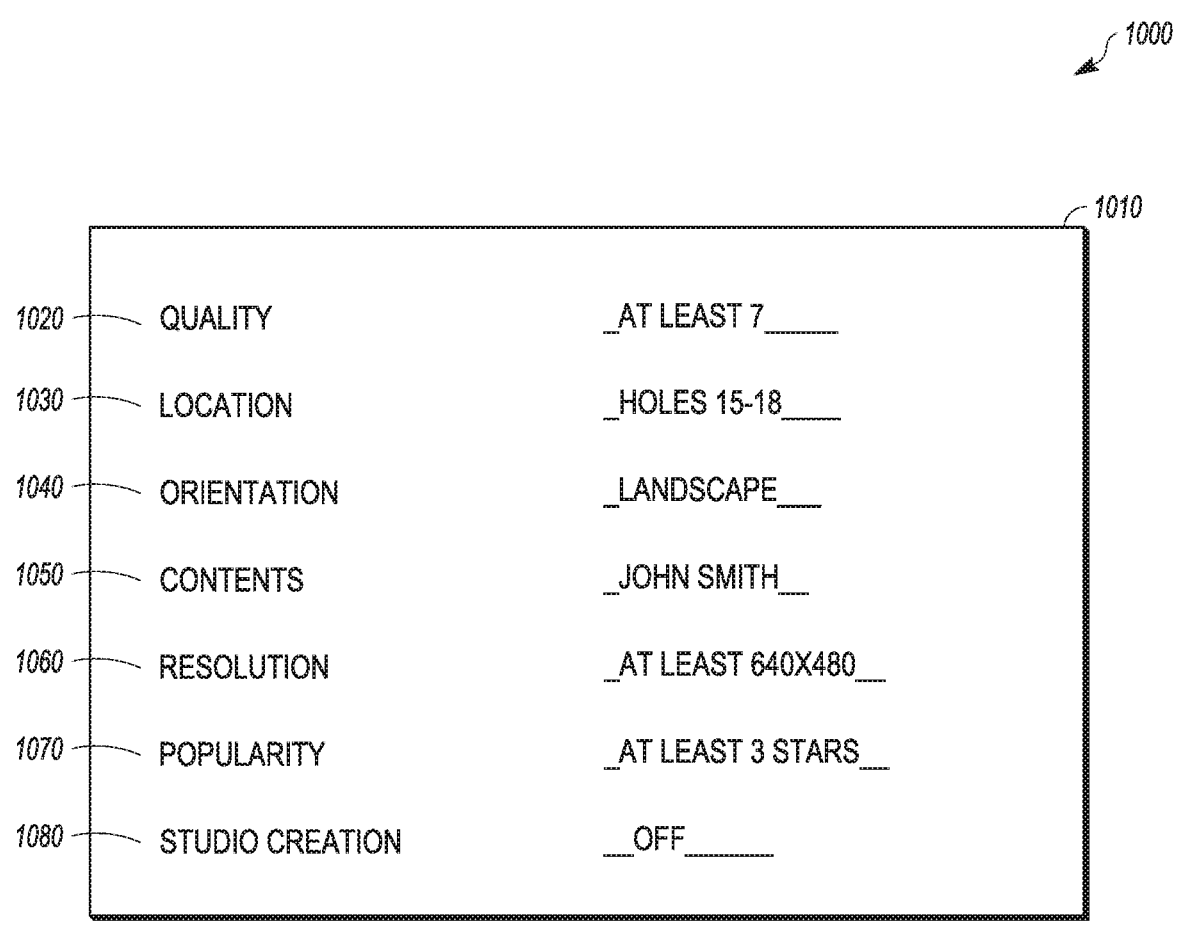
FIG. 10 is an example user preference interface.

FIG. 9 is a flowchart illustrating stream selection process by the client. FIG. 10 is an example User Preference Interface 1000 and User Preference Interface GUI (graphical user interface) 1010 utilized in the user selection and management of streams. The user can have the ability to manually select a change of stream, to send a stream, to change their preferences, and control the video. The client also has the option to leave the stream set entirely and join a completely different set of streams. In addition to selecting streams, the client will be able to allow the user to control the video in all the typical methods, fast forward, rewind, skip forward, skip back, volume control, and other controls.

During the initial registration and configuration, at step 910, a client will join with the servers who are collecting and processing video from multiple cameras. The client is then authenticated. Authorizations are verified, as for example, the server side system may be behind a paywall, and offer its services only to valid subscribers.

At step 920, once a client has successfully connected, it is presented with a set of available multi-video streams via the User Preference Interface GUI 1010. Each of these streams will have certain meta-data attributes such as Title, Thumbnail, date, time, number_of_streams, quality, popularity, description, etc. (for example 1020-1080 shown in 1010). In additional any number of other attributes can be present in streams.

The client will present these options to the user, and at step 930 the user will select a stream set. The client will relay that to the servers, and a streaming session will be established.

Moving to stream viewing, once connected, at step 940, a clientcan begin presenting video and audio streams to the user. The stream bundle itself has metadata as described above, but each stream will also have metadata. This metadata could include such aspects as: text data entered by a camera operator, URLs to interesting information that can be parsed by the client, GPS coordinates of the camera, Angle & orientation of the camera, distance to objects being filmed, resolution, popularity, and images such as pictures of players or field. Other metadata can be included.

Fundamentally, there are multiple streams and there are several possible ways that the client will select the first stream to present. In an embodiment, a User Preference Interface can be accessed by a user via the User Interface Preference Selection Screen. Some possible ways are to start with the oldest stream, Newest Stream, Best Quality Stream, Most Popular Stream, Based on Metadata. In other embodiments, these and other criteria can be used. An example preference interface 1000 can be referred to in FIG. 10 at an example user preference interface template 1010. This user interface will be available to a user via a client device.

Once the initial stream is selected, a client begins presenting that stream to the user. From there, the client will continue to acquire and present streams to the user based on either direct user selection or automatically via an algorithm based upon user preferences.

The automatic algorithms would use similar attributes to those used to select an initial stream. Referring to the example User Preference Interface 1000 and associated User Preference Interface GUI 1010 in FIG. 10, in one embodiment of an approach or algorithm based on metadata, the user has connected to a set of streams at a large sporting event such as a golf tournament, and has decided that they want to always view the best quality stream that contains the popular golfer named "John Smith" 1050.

In this embodiment, each stream contains quality information in the metadata. This metadata is either generated by the server through video analysis 1020, and resolution data 1060, or from viewers themselves who look at and rate the streams 1070, or some combination of these. In this embodiment, each stream contains metadata about its contents 1050. This metadata is either entered by the camera operator, by viewers, or by a server-side process such as facial recognition. Thus, for instance, example streams at the example golf tournament would include metadata such as: Stream 1: Contents 1050: "John Smith" "Phil Jones" "Tom Brown", Quality 1020: 10, Time 0:00-1:00; Stream 2: Contents 1050: "Tom Brown", Quality 1020: 5, Time 0:30-2:00; and Stream 3: Contents 1050: "John Smith", Quality 1020: 7, Time 0:45-1:30.

Of those examples, where the user has expressed the desire to follow "John Smith," the user would start off viewing stream 1, as it includes "John Smith" and is very good quality. However say that the stream ends at 1:00. So at that point the user must switch to another stream. At this point, Stream 3 is the best choice, as it also includes "John Smith" and is good quality. At time equals 1:30, Stream 3 ends and so the user has no choice but to either end his session altogether or switch to stream 2, which does not include his targeted golfer. In other embodiments, with additional and unlimited number of possible streams, the possibilities become much more complex.

In yet another embodiment method, the streams can be curated on the server side, by a "director." With the large number of streams available, it is possible to have such a "director" create what would be "optimal" and/or default views which sequence through the various streams in a particular order to tell a narrative much like traditional broadcasts. A key improvement not already done in the art is that there are more both streams to select from AND that there is the opportunity for multiple curated narratives.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

We claim:

1. A method of providing a multi-camera system for video data:
    registering a first camera device with a server, the first camera device having video and metadata data;
    encoding the first camera device data into a first compressed stream;
    transmitting a URL for a consolidated manifest file to the server from the first camera device;
    registering a second camera device with the server, the second camera device having, video and metadata data;
    encoding the second camera device data into a second compressed stream;
    packetizing each of the first and second compressed streams and dividing the first and second streams into chunks; and
    transcoding the first and second compressed streams according to bandwidth constraints,
    wherein for the first camera device, any metadata is synced with video data in the chunks of the first compressed stream and wherein for the second camera device, any metadata is synced with video data in the chunks of the second compressed stream.

2. The method of claim 1, wherein the registering a first camera device with a server comprises:
    transmitting a join request from the first camera device to the server;
    evaluating the join request from the first camera device at the server; and
    accepting the join request from the first camera device at the server.

3. The method of claim 2, further comprising:
    assigning an identification to the first camera device at the server.

4. The method of claim 3, further comprising:
    transmitting an accept message to the first camera device from the server.

5. The method of claim 4, further comprising:
    transmitting a URL for a consolidated manifest file to the server from the second camera device.

6. The method of claim 1, wherein metadata comprises one or more of the following: text data entered by a camera device user, URLs to relevant information, GPS coordinates of a camera device, images or pictures of items relevant to video data, angle and orientation of camera device, and distance to items being filmed.

7. The method of claim 1, further comprising:
    packetizing the transcoded the first and second compressed streams; and
    providing the packetized first and second compressed streams to the server.

8. The method of claim 7, wherein the server outputs a set of transport stream chunks for each of the first and second compressed streams.

9. The method of claim 8, wherein the transport stream chunks for the first compressed stream and the transport stream chunks for the second transport stream line up with each other at a chunk boundary.

10. The method of claim 1, wherein the server monitors the quality of the first camera device data and second camera device data.

11. The method of claim 10, wherein the server removes a camera device if the quality of the camera device data falls below a threshold.

12. The method of claim 1, wherein each camera device having audio, video and metadata data.

13. The method of claim 1, wherein the chunks each of the first and second streams line up with each other at a chunk boundary.

14. A client device for providing multi-camera video data, comprising:
    a processor configured to load and execute instructions from a server that is collecting and processing video data from multiple camera devices; and
    said server configured to:
    register multiple camera devices, each camera device having video and metadata data;
    encode each camera device data into a compressed stream;

packetize each of the compressed streams and dividing the streams into chunks;

transmit a URL for a consolidated manifest file to the server from each camera device; and transcode each compressed stream according to bandwidth constraints, wherein for each camera device, any metadata is synced with video data in the chunks of each of the compressed streams.

15. The client device of claim 14, wherein the client device is configured to present each of the compressed streams to a user.

16. The client device of claim 14, wherein each camera device having audio, video and metadata data.

17. The client device of claim 14, wherein the chunks of each of the compressed streams line up with each other at a chunk boundary.

\* \* \* \* \*